(12) United States Patent
Ma et al.

(10) Patent No.: US 12,235,861 B2
(45) Date of Patent: Feb. 25, 2025

(54) AUTOMATED REFINEMENT AND CORRECTION OF EXPLORATION AND/OR PRODUCTION DATA IN A DATA LAKE

(71) Applicant: SCHLUMBERGER TECHNOLOGY CORPORATION, Sugar Land, TX (US)

(72) Inventors: Tze W. Ma, Spring, TX (US); Vincent Bergbauer, Katy, TX (US); Krishna Mudda, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 84 days.

(21) Appl. No.: 16/646,930

(22) PCT Filed: Sep. 13, 2018

(86) PCT No.: PCT/US2018/050870
§ 371 (c)(1),
(2) Date: Mar. 12, 2020

(87) PCT Pub. No.: WO2019/055647
PCT Pub. Date: Mar. 21, 2019

(65) Prior Publication Data
US 2020/0278979 A1    Sep. 3, 2020

Related U.S. Application Data

(60) Provisional application No. 62/557,871, filed on Sep. 13, 2017.

(51) Int. Cl.
*G06F 16/25*     (2019.01)
*G06F 16/215*    (2019.01)
(Continued)

(52) U.S. Cl.
CPC .......... *G06F 16/254* (2019.01); *G06F 16/215* (2019.01); *G06F 16/2365* (2019.01); *G06N 20/00* (2019.01)

(58) Field of Classification Search
CPC .. G06F 16/254; G06F 16/215; G06F 16/2365; G06N 20/00
See application file for complete search history.

(56) References Cited

U.S. PATENT DOCUMENTS 8,577,823 B1    11/2013  Gadir
2002/0198902 A1*  12/2002  Sankaran ............. G06F 16/254
                                                  707/999.203
(Continued)

FOREIGN PATENT DOCUMENTS

WO    2015/152880 A1    10/2015

OTHER PUBLICATIONS

International Preliminary Report on Patentability for the counterpart International patent application PCT/US2018/050870 mailed on Mar. 26, 2020.

(Continued)

*Primary Examiner* — Jensen Hu
(74) *Attorney, Agent, or Firm* — Michael Guthrie

(57) ABSTRACT

Methods, apparatus, systems, and computer-readable media are set forth for receiving data from a client device, the data associated with an operation occurring at an exploration and production system, ingesting the received data into a data lake, applying one or more transformations to the ingested data prior to consumption of the data, and tracking the one or more transformations made to the ingested data.

17 Claims, 9 Drawing Sheets

(51) Int. Cl.
*G06F 16/23* (2019.01)
*G06N 20/00* (2019.01)

(56) References Cited

U.S. PATENT DOCUMENTS

| | | | |
|---|---|---|---|
| 2008/0016502 A1* | 1/2008 | Henderson | G06F 16/24 |
| | | | 717/143 |
| 2011/0258007 A1 | 10/2011 | Heggelund et al. | |
| 2012/0109879 A1* | 5/2012 | Devadoss | G06F 9/4843 |
| | | | 707/602 |
| 2014/0156806 A1 | 6/2014 | Karpistsenko et al. | |
| 2016/0248792 A1* | 8/2016 | Tidwell | G06F 16/2455 |
| 2016/0253340 A1* | 9/2016 | Barth | G06F 16/122 |
| | | | 707/756 |
| 2017/0006135 A1 | 1/2017 | Siebel et al. | |
| 2017/0177309 A1* | 6/2017 | Bar-Or | G06F 8/34 |

OTHER PUBLICATIONS

International Search Report and Written Opinion for the counterpart International patent application PCT/US2018/050870 mailed on Feb. 13, 2019.

* cited by examiner

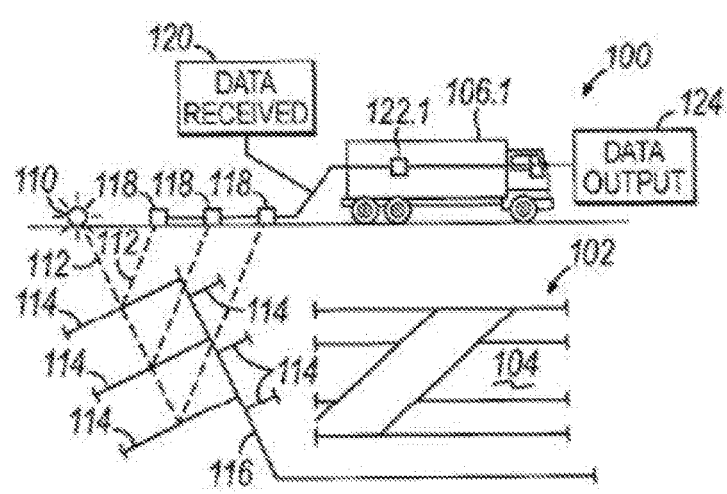
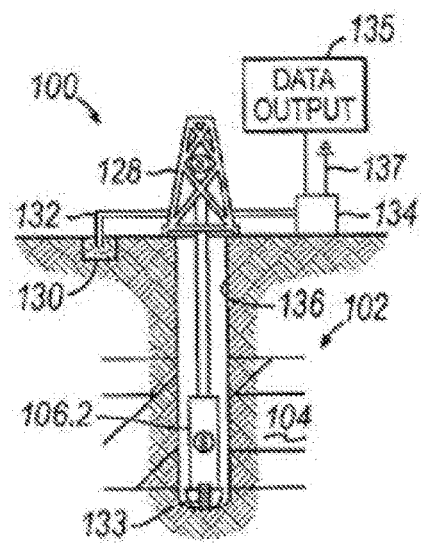
FIG. 1.1    FIG. 1.2
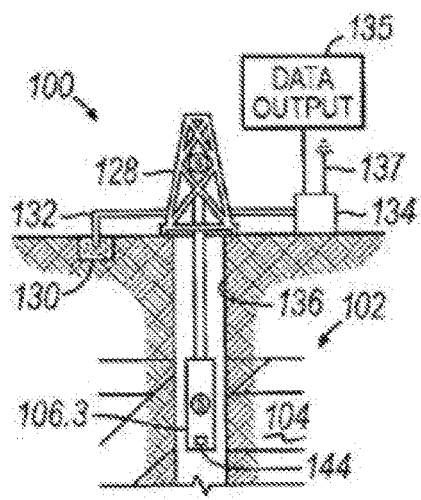
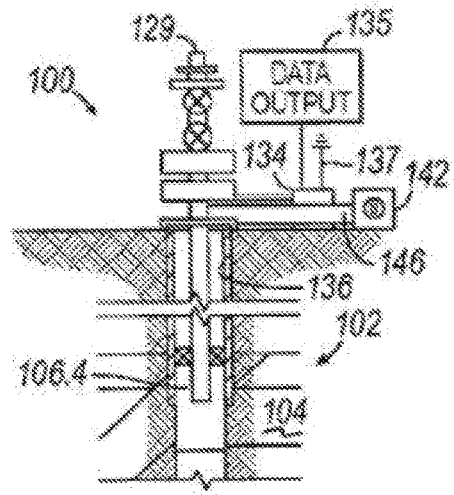
FIG. 1.3    FIG. 1.4

AUTOMATED REFINEMENT AND CORRECTION OF EXPLORATION AND/OR PRODUCTION DATA IN A DATA LAKE

CROSS-REFERENCE TO RELATED APPLICATION(S)

This application claims priority to and the benefit of a US provisional application having Ser. No. 62/557,871, filed 13 Sep. 2017, which is incorporated by reference herein.

BACKGROUND

In the oil and gas industry, data is often generated from a variety of sources for clients that seek to remain privy to the latest trends in exploration and production technology. When data is not consistent or inaccessible, decisions made by such clients may not be the most well-informed, potentially resulting in production inefficiencies. Furthermore, enterprises of all types and sizes are coping with a wider variety of data at a very large scale, making it more difficult than ever to realize production insights. At the same time with the growth in cloud based commodity computing, it is becoming increasingly difficult to package insights for delivery to customers and clients.

SUMMARY

Methods, apparatus, systems, and computer-readable media are set forth for processing exploration and production data to make such data more readily available for clients seeking to leverage the data for analytics and other services. In some implementations, a method implemented by one or more processors may receive data from a client device, the data associated with an operation occurring at an exploration and production system, ingest the received data into a data lake, apply one or more transformations to the ingested data prior to consumption of the data, and track the one or more transformations made to the ingested data.

In some implementations, ingesting the received data includes tracking the origin of the received data, where applying the one or more transformations includes generating metadata from the one or more transformations, and where n the method further includes, in response to an external change to the received data, identifying the origin of the data from the tracked origin and automatically reapplying the one or more transformations to the changed data using the tracked one or more transformations. In some implementations, ingesting the received data includes storing the received data in the data lake in a same format in which the received data is received, and in some implementations, applying the one or more transformations includes applying a machine language transformation to the ingested data or to data transformed by another transformation.

In some implementations, tracking the one or more transformations includes tracking an origin, a provenance and/or a lineage of the received data, and in some implementations, tracking the one or more transformations includes tracking a transformation of a process and/or a version of a transformation. In some implementations, applying the one or more transformations includes applying a data cleansing transformation, a data matching transformation, a frame of reference conversion transformation, a model mapping transformation, a data aggregation transformation, or a machine learning transformation, and in some implementations, tracking the one or more transformations includes tracking a sequence of transformations applied to the received data. Still other implementations further include consuming the data after applying the one or more transformations.

Some implementations also include a system including one or more processors and memory configured to store instructions that, when executed by one or more processors, cause the one or more processors to perform any of the aforementioned operations, as well as a non-transitory computer readable medium configured to store instructions that, when executed by one or more processors, cause the one or more processors to perform any of the aforementioned operations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 1.1-1.4 illustrate simplified, schematic views of an oilfield having subterranean formation containing reservoir therein in accordance with implementations of various technologies and techniques described herein.

DETAILED DESCRIPTION OF THE INVENTION

Figure 2:
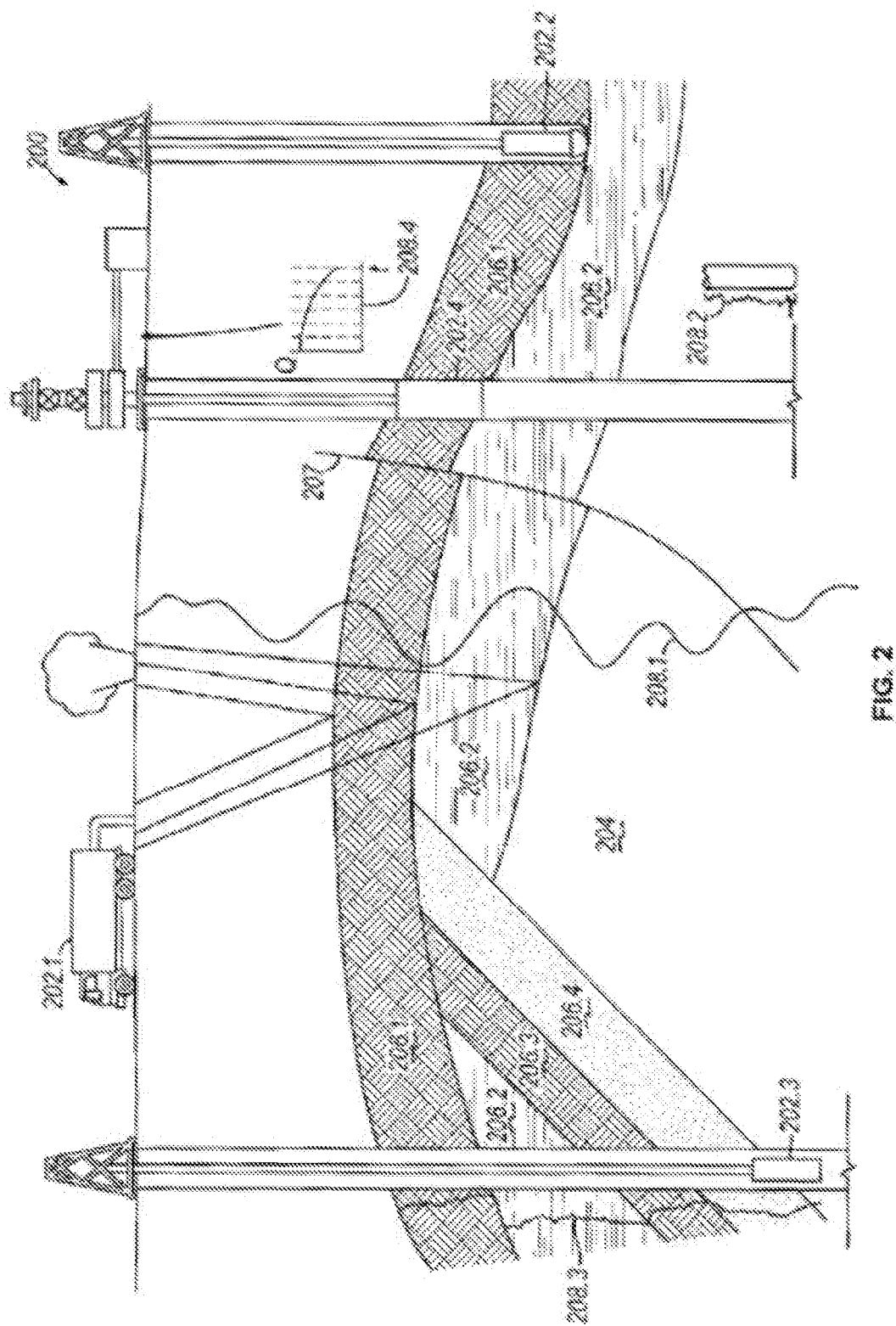
FIG. 2 illustrates a schematic view, partially in cross section of an oilfield having a plurality of data acquisition tools positioned at various locations along the oilfield for collecting data from the subterranean formations in accordance with one or more embodiments.

Although systems to collect data have been developed and made available for many years in the oil & gas industry, the adoption has proven to be difficult. Some of the barriers to such adoption have been the extraction of data from heterogeneous sources and the subsequent ingestion into a common format. This format is typically called canonical model and is used to communicate between systems, and it has been found that the hub and spoke model of this communication pattern has been proven to be expensive at enterprise scale.

In many situations, the expense is due in part to the cost of change between systems. Since there are many connections to a hub within a hub-and-spoke model, even a simple change may incur cost to each connected system even though the connected systems may not be concerned about the specific changes to the underlying model.

Some embodiments consistent with the invention address at least some of these issues by ingesting data in its original format, and then employing multiple consumption models catered to the specific needs of various data consumers. By ingesting data in its original format, ingestion of new data may be easier and faster to accomplish, and moreover, in some implementations, since the data is stored in original format, the risk of data loss is reduced due to unnecessary conversion and transformation to a common model as has been employed in traditional data warehouses.

In some implementations, the ingested data may include both structured and unstructured data, and the various consumption models may include consumption models such as data discovery consumption models, data analytics consumption models, scientific applications consumption models and data reporting consumption models, among others. In particular, in some implementations, one or more late stage fit-for-purpose transformers may be employed for data cleansing, data matching, Frame of Reference (FoR) conversion, model mapping, and data aggregation for data analytics, among others. Moreover, in some implementations, these transformers may be configured to work with data in original format within a data repository such as a data lake. Further, in some implementations, the transformers may be configured as plug-ins and may be provided by and usable by multiple entities.

In addition, in some implementations, throughout a transform process applied to data (which may also be referred to herein as a transformation pipeline), one or more of the identity, ownership, transformations and the specific sequence of specific transform operations performed may be tracked for the data.

Further, in some implementations, data may be tagged with metadata to further characterize the data. The metadata may include, for example, an access control descriptor, legal definition descriptor, and a summary and aggregated definition, which may be used to control access and/or drive search heuristics to data in a data lake or other data repository. In addition, as will become more apparent below, some implementations may automatically recalibrate, refine, correct and/or recalculate data based on substantially continuous tracking of lineage information of an object, provenance of the system, transformation of the process and/or the version of specific transformations applied to the data.

The described embodiments generally relate to systems, methods, and apparatus for processing exploration and production data to make such data more readily available for clients seeking to leverage the data for analytics and other services. In this regard, the term "exploration and production" generally refers to data, activities, operations, etc. associated with the exploration and/or production of natural resources. Thus, exploration and production data may include data that is associated solely with natural resource exploration activities, data associated solely with natural resource production activities, data associated with both natural resource exploration activities and natural resource production activities, and even data associated with support activities for any of the aforementioned natural resource activities.

The exploration and production data can be made available at a data lake, which can act as a data repository. As will become more apparent below, that data may be ingested and maintained in its original format, and one or more transformations may be made for the purposes of consuming that data, with transformation tracking performed to enable the transformations made to the data to be reproduced in the future. In some implementations, data can be received from a client device or other source domain. Thereafter, the data can be received at a data lake that includes one or more applications for processing the received data. The data lake can be embodied as a data lake system that can receive data from one or more different oilfield operations. In some implementations, the oilfield operations can include production operations, drilling operations, tooling operations, and/or monitoring operations, among others.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the embodiments. However, it will be apparent to one of ordinary skill in the art that various embodiments may be practiced without these specific details. In other instances, well-known features have not been described in detail to avoid unnecessarily complicating the description.

FIGS. 1.1-1.4 illustrate simplified, schematic views of an oilfield 100 having subterranean formation 102 containing reservoir 104 therein in accordance with implementations of various technologies and techniques described herein. FIG. 1.1 illustrates a survey operation being performed by a survey tool, such as seismic truck 106.1, to measure properties of the subterranean formation. The survey operation is a seismic survey operation for producing sound vibrations. In FIG. 1.1, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1.2 illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is generally filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan generally sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool 106.3 suspended by rig 128 and into wellbore 136 of FIG. 1.2. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein. In general, wireline tool 106.3 may thereby collect acoustic data and/or image data for a subsurface volume associated with a wellbore.

Wireline tool 106.3 may be operatively connected to, for example, geophones 118 and a computer 122.1 of a seismic truck 106.1 of FIG. 1.1. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1.4 illustrates a production operation being performed by production tool 106.4 deployed from a production unit or christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1.1-1.4 are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1.1-1.4, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 3:
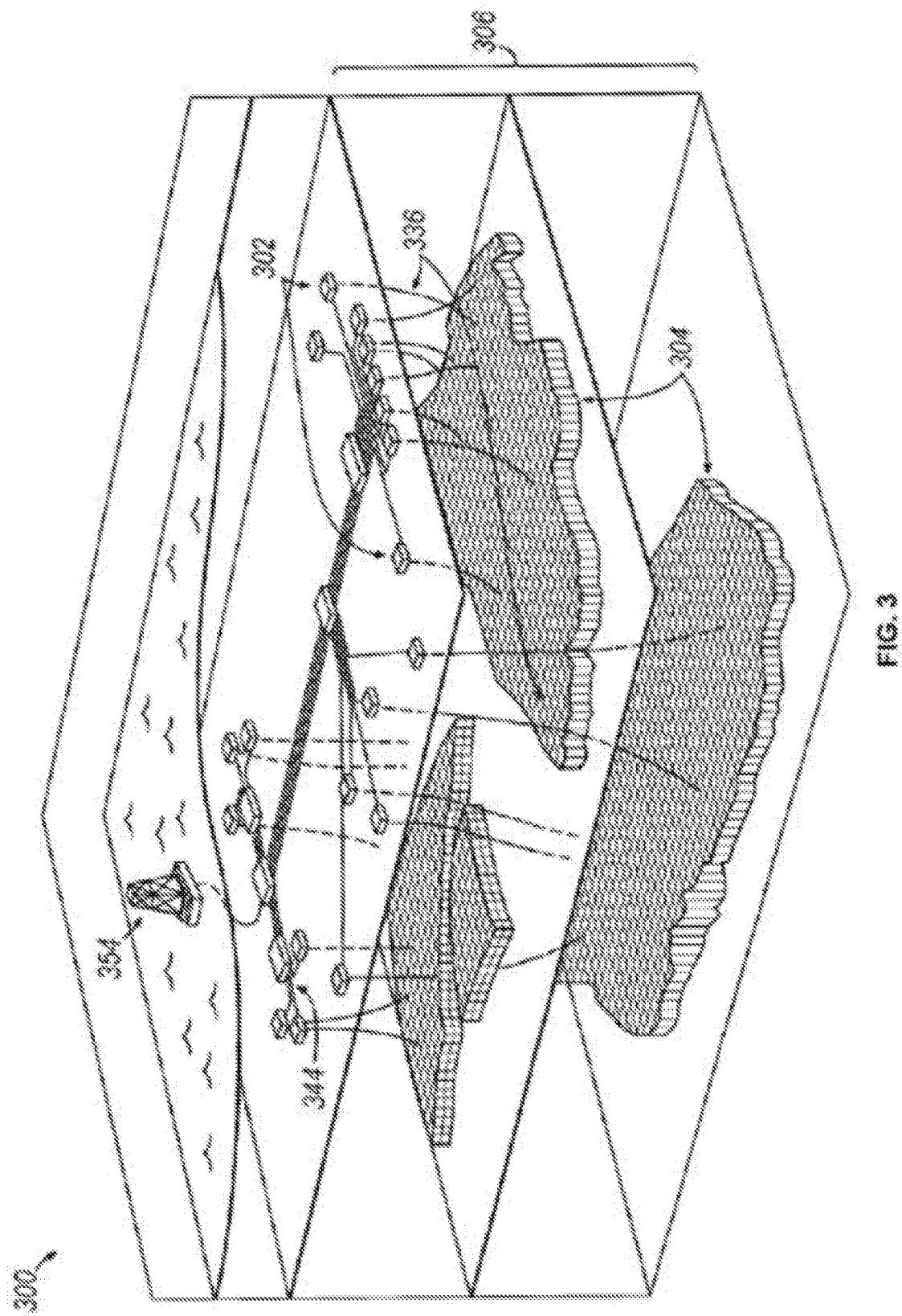
FIG. 3 illustrates a production system for performing one or more oilfield operations in accordance with one or more embodiments.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 4:
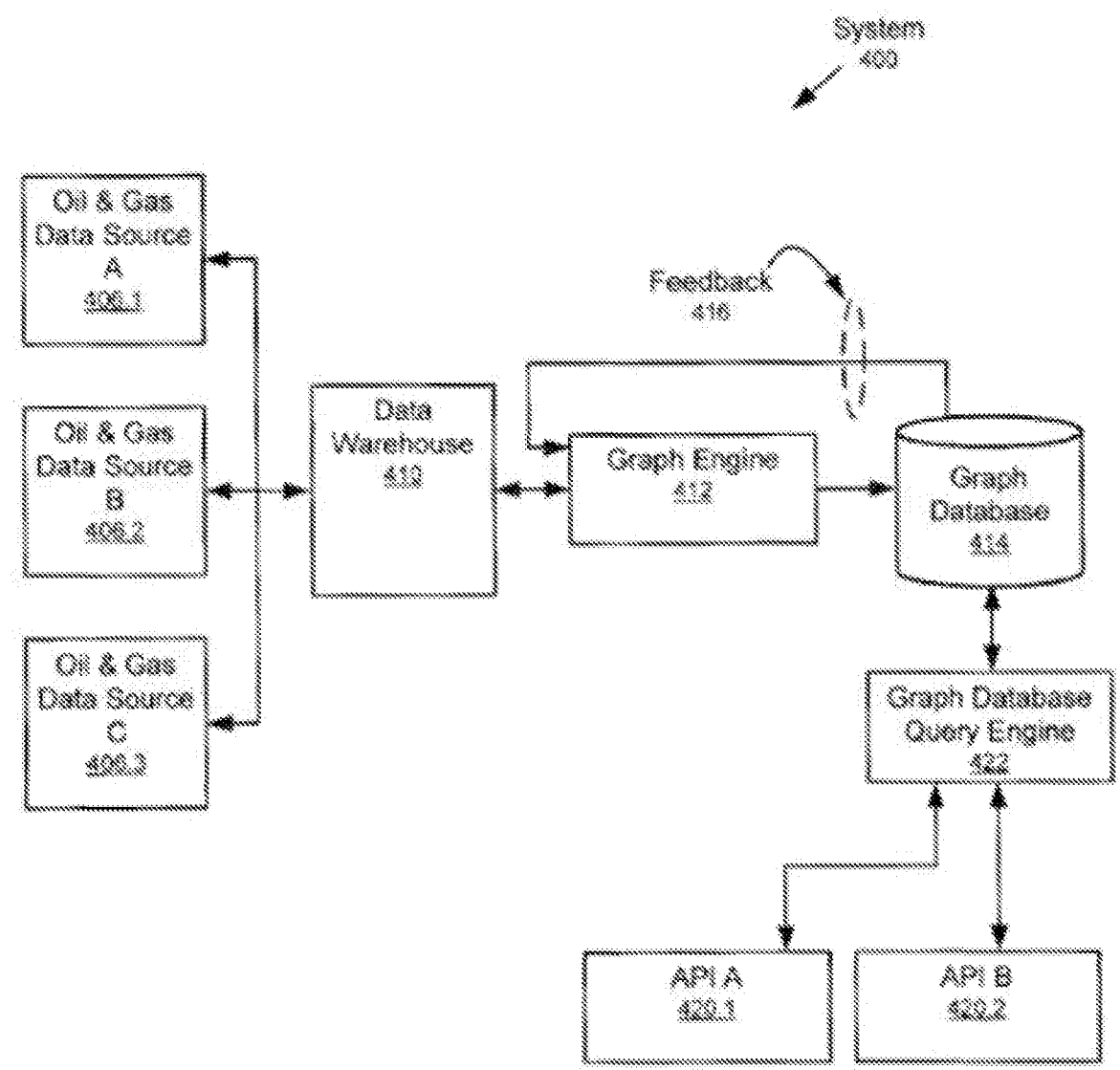
FIG. 4 illustrates a system in accordance with one or more embodiments.

FIG. 4 shows a system 400 in accordance with one or more embodiments. The system 400, or part of the system 400, may be located in a surface unit (e.g., surface unit (134)). As shown in FIG. 4, the system 400 has multiple components including multiple data sources (e.g., OG Data Source A 406.1, OG Data Source B 406.2, OG Data Source C 406.3, a data warehouse 410, a graph engine 412, a graph database 414, a graph database query engine 422, and one or more APIs (e.g., API A 420.1, 420.2). Each of the components (406.1, 406.2, 406.3, 410, 412, 414, 422, 420.1, 420.2) may be located on the same computing device (e.g., server, mainframe, personal computer, laptop, tablet PC, smart phone, kiosk, etc.) or on different computing devices connected by a network of any size or topology with wired and/or wireless segments.

As shown in FIG. 4, the system 400 has multiple OG data sources 406.1, 406.2, 406.3. These OG data sources 406.1, 406.2, 406.) may correspond to sensors or measurement tools on site in an oilfield. These OG data sources 406.1, 406.2, 406.3 may correspond to external databases or websites. The OG data sources 406.1, 406.2, 406.3) output data items. These data items may be of any type or size relevant to an oilfield. For example, these data items may include well fracturing depth-temperature-energy band data (real-time or playback from previously fractured wells), user annotations and comments, any open literature, etc.

In one or more embodiments, the system 400 includes data warehouse 410. The data warehouse 410 may correspond to one or more repositories. The data warehouse (410) ingests (e.g., obtains and stores) the data values from the OG data sources 406.1, 406.2, 406.3. The data warehouse 410 is effectively a consolidated source of data items regarding an oilfield.

In one or more embodiments, the system 400 includes the graph engine 412. The graph engine 412 applies one or more transformations (e.g., pipelines) to the data items to generate one or more transformed data items. Application of one or more transformations may be triggered by various conditions (e.g., changes in temperature, pressure, depth, composition in well, etc.). Application of one or more transformations may occur at set times or milestones. One or more transformations may be custom designs. One or more transformation include machine learning. Example transformations include: data cleansing (bound checks, NaN), conversion to different format, aggregates based on one or more state changes, statistical calculations (variance, mode, standard deviation).

In one or more embodiments, the system 414 includes the graph database 414. The graph database 414 implements a knowledge graph for an oilfield. In other words, the graph database 414 is an OG graph database. The graph database 414 includes one or more nodes connected by one or more edges. Each node may correspond to one or more entities in the oilfield. Each edge is a relationship between two or more nodes. In one or more embodiments, the graph engine 412 modifies (e.g., populates, enriches, shrinks, etc.) the graph database 414 based on the transformed data items. This may include modifying existing nodes and edges, removing existing nodes and edges, and/or inserting new nodes and new edges. The nodes or edges may include the transformed data items. For example, nodes may correspond to wells, client/customer ID, chemicals used in the oilfield. Edges may correspond to any links between these nodes & disconnected data silos.

As shown in FIG. 4, there exists a feedback loop 416 from the graph database 414 to the graph engine 412. One or more node or edges in the graph database 414 may be data values that are transformed by the graph engine 412.

In one or more embodiments, the system 400 includes the graph database query engine 422. The graph database query engine 422 receives user requests regarding an oilfield entity and generates a result to the request. The result may be generated by traversing the graph database 414. The result may be a summary or digest regarding the oilfield entity. For example, the user request may be: "Give me a summary of all wells fractured between December 1 and December 31 in year XXXX for client A."

In one or more embodiments, the system 400 includes multiple APIs 420.1, 420.2. It is through the APIs 420.1, 420.2 that users may issue request and obtain (e.g., view, print) results in response to the request. APIs provide data to monitoring front-end and may have a rich user interface to view data close to real-time in the form of heat maps, line plots, etc.

Figure 5:
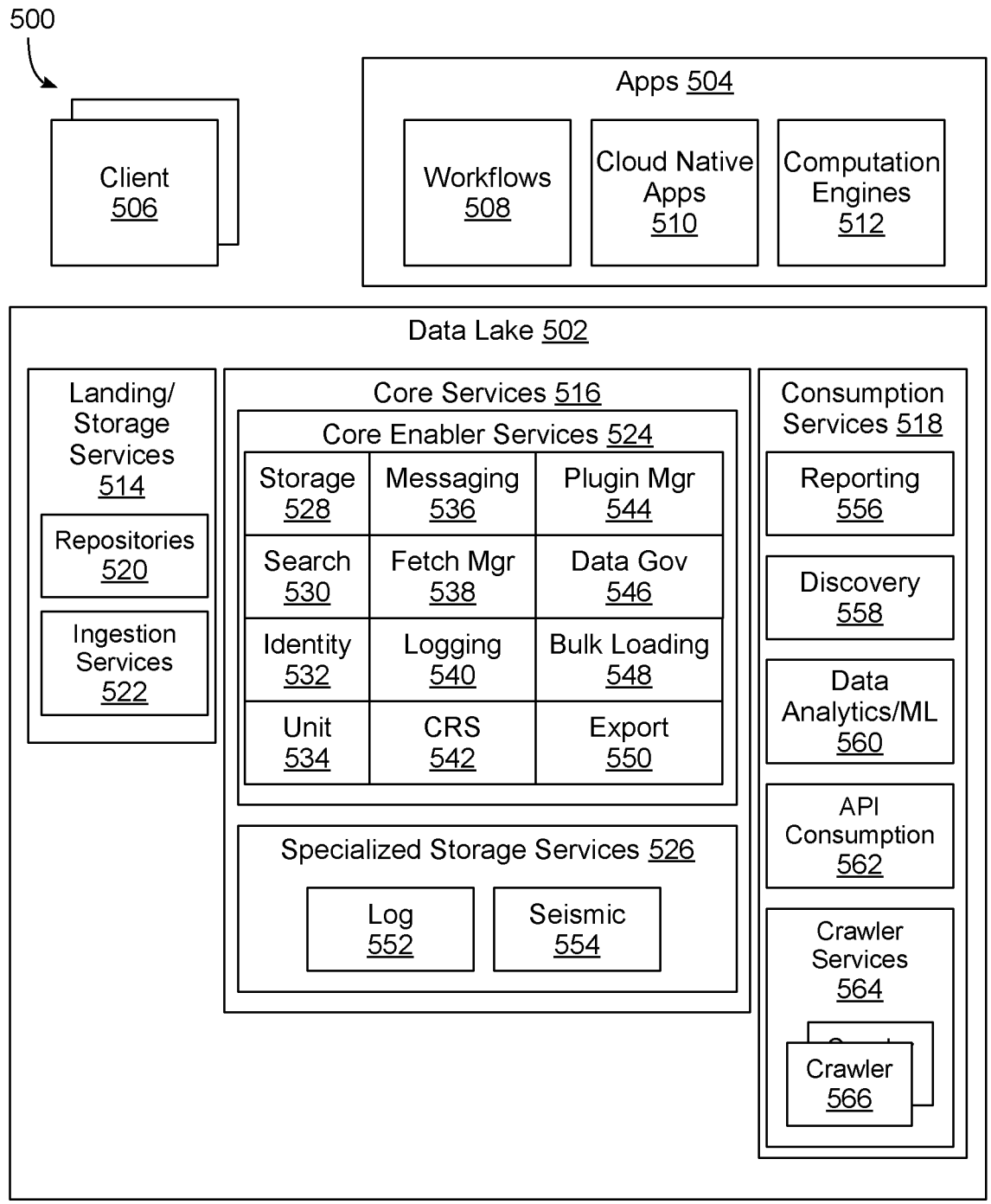
FIG. 5 illustrates a system for providing a data lake that can apply transformations to data for the purposes of consuming the data.
Figure 6:
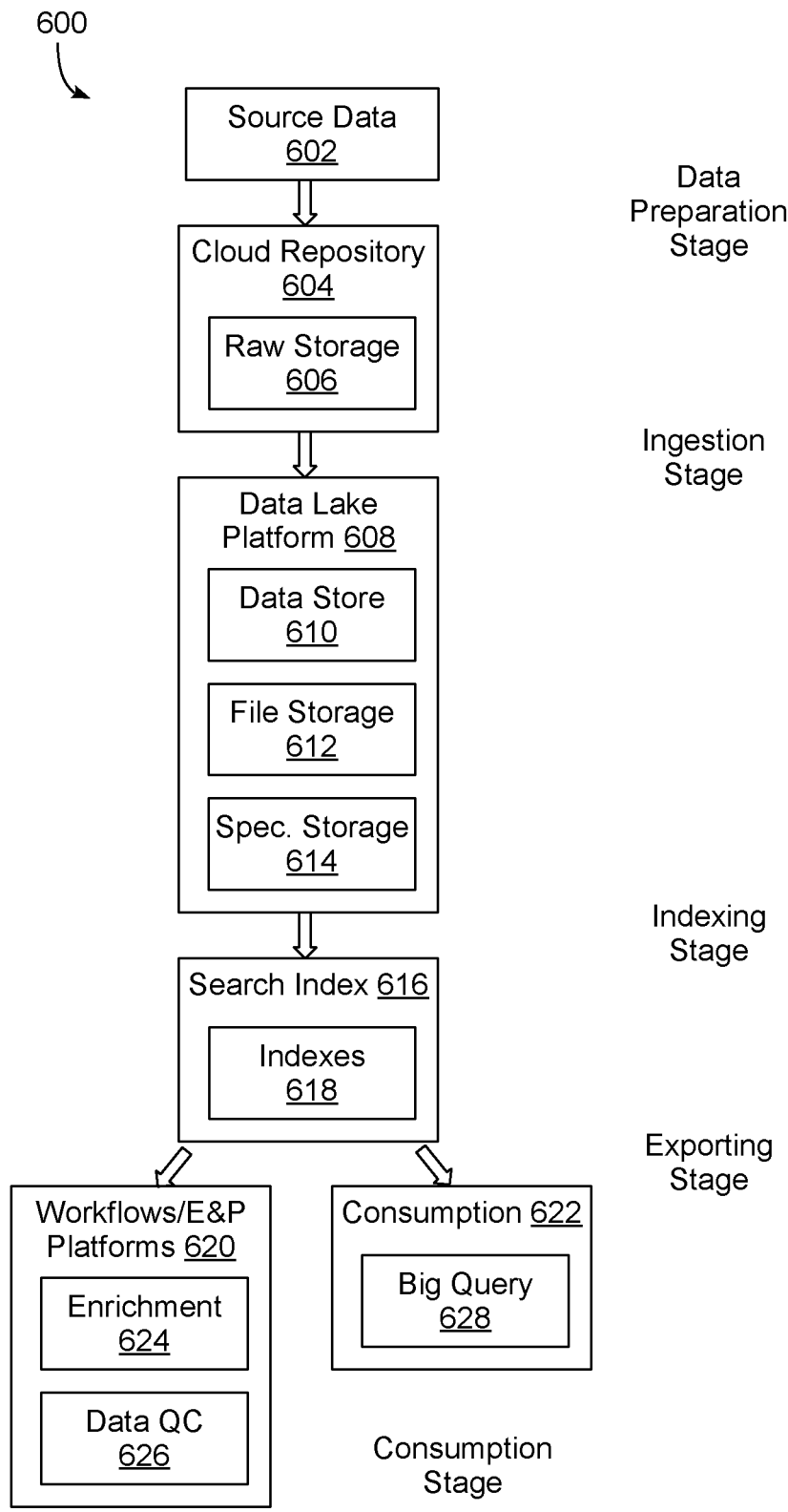
FIG. 6 illustrates a method for ingesting, indexing and exporting data to and from a data lake for the purposes of consuming the data.
Figure 7:
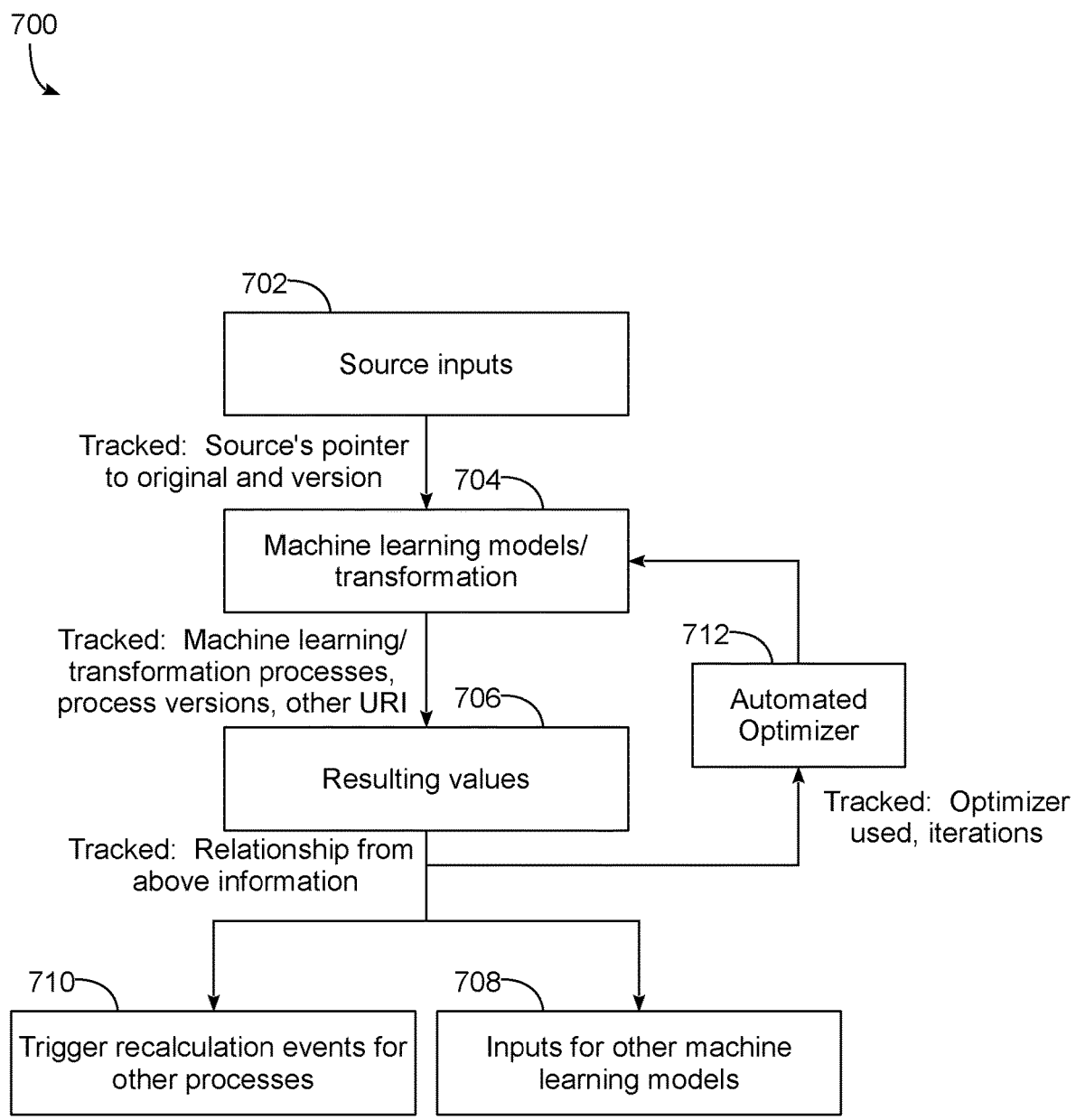
FIG. 7 illustrates a method for transforming and tracking data in a data in accordance with one or more embodiments.

Now turning to FIGS. 5-7, in some embodiments of the invention, automatic refinement and correction of data in a data lake may be performed based on continuous tracking of lineage information of a data object, provenance of the system, transformation of the process, and/or the specific version of a transformation of the data object. A transformation, in this regard, refers to some transformation of data from one state to another state in a reproducible manner, and may be considered to include less complex model mappings as well as more complex operations such as running mathematical simulators. A transformation may also include a machine learning-based transformation. A specific version of a transformation captures an existing state of the transformation such that previous results can be readily reproduced.

FIG. 5, for example, illustrates an example system 500 including a data lake 502, which serves as a data repository, and which is accessible by one or more applications 504 as well as one or more clients 506. The applications that may access data lake 502 can vary considerably, and can include, without limitation, workflows 508 (e.g., service provider applications, custom workflows, etc.), cloud native applications 510 (e.g., operation stores), and computation engines 512 (e.g., computation services and custom engines). Data lake 502 may include various components such as landing/storage services 514, core services 516 and consumption services 518.

Landing/storage services 514 may receive and store exploration and production data begin ingested into data lake 502, and may include various repositories 520, including national, public, proprietary and/or commercial repositories, among others. Landing/storage services 514 may also include various ingestion services 522, e.g., both standard exploration and production ingestion services such as LAS, WitsML and Seismic Metadata parsing services as well as non-standard ingestion services such as CDA, HIS, and various proprietary or custom ingestion services.

Core services 516 may handle various core operations for data lake 502, and may include various core enabler services 524 and various specialized storage services 526. Among the core enabler services 524 may be included services such as storage services 528, search services 530, identity services 532, unit services 534, messaging services 536, fetch manager services 538, logging services 540, core reference system (CRS) services 542, plugin manager services 544, data governance services 546, bulk loading services 548 and export services 550. Likewise, specialized storage services 526 may include services such as log storage services 552 and/or seismic storage services 554.

Consumption services 518 may handle various activities related to consumption of data in data lake 502, including various reporting services 556, discovery services 558, data analytics and/or machine learning (ML) services 560, and may additionally include various API-accessible consumption services 562. Furthermore, crawler services 564 may include one or more crawlers 566 such as entity crawlers, log crawlers, and various customer crawlers.

It will be appreciated that the combination and organization of services employed in data lake 502 is merely exemplary, and may vary in other embodiments. Thus, the invention is not limited to the particular combination and/or organization of services illustrated in FIG. 5.

FIG. 6 illustrates the stages in an ingestion process 600 using data lake 502 consistent with some embodiments of the invention. In this process, source data 602, e.g., as may be supplied from the same or a different entity that manages the data lake, may be moved to a cloud repository 604, e.g., into raw storage 606, in a data preparation stage. The data may be moved, for example, using a data mover service. Then, once in the cloud repository, the data may be ingested into a data lake platform 608 in an ingestion stage, e.g., into a data store 610, file storage 612 or specialized storage 614 as appropriate. The ingestion may be performed in some implementations using a custom or native ingestor component or service.

Next, in an indexing stage, an indexing service may index the ingested data into a search index 616, e.g., in one or more indexes 618 thereof. The indexes 618 may then be used by various workflows and/or exploration and production software platforms 620, as well as consumed by various consumption technologies 622, in an exporting stage, which may, for example, generate one or more consumption models from the data lake. The workflows and platforms 620 may include, for example, data enrichment 624 and/or data quality control (QC) 626, and the consumption technologies may include, for example, enterprise query services 628 such as BigQuery, among others, which utilize the exported data in a consumption stage.

Thus, in some embodiments of the invention, data such as exploration and production data may be ingested and maintained in its original format in a data lake (including structured and/or unstructured data), and then processed, customized, refined or otherwise transformed as needed for consumption, with tracking of the transformations performed from the original format to the format exported for consumption. For example, various late stage fit-for-purpose transformers may be utilized in some embodiments for purposes such as data cleansing, data matching, Frame of Reference (FoR) conversion, model mapping, data aggregation, data analytics, etc. The transformers may work with data in its original format within the data lake, and transformers may be configured in some instances as "standard" transformers that are native to the data lake as well as custom transformers that are provided by either the same or a different entity from the entity that manages the data lake, and that may be configured, for example, as plugins or other installable components.

Moreover, as noted above, operations performed by transformers may be tracked such that data in various stages of transformation can be recreated, e.g., by tracking one or more of data object identity, ownership, provenance, origin, transformation(s) applied, and the sequence of specific transform operations applied to the data. Further, such tracking may also incorporate the introduction of additional metadata, e.g., access control descriptors, legal definition descriptors, summary and/or aggregated definitions, etc., which may be used to control access and/or drive search heuristics. Doing so may also enable automatic refinement and/or correction of data in response to external changes to data to which one or more transformations have been applied.

As illustrated by process 700 of FIG. 7, for example, an entity from a heterogeneous data source may enter a system with a data lake as a source input 702. At this stage, the entity's content and its origin may be captured and tracked in the data lake as lineage. A machine learning model or transformation may be thereafter run on a number of entities as inputs (block 704) to generate resulting values 706, and the machine learning and/or transformation processes, process versions and other URI may be tracked as a result.

One such example is that drilling log curves from a drilling operation may enter the system in a standard industry format such as DLIS or LAS. The origin of such drilling log curves may be tracked within the data lake. Additional metadata such as quality score, verified channels and verified channel units may be generated based on a number of pre-defined and custom transformations. This metadata may be used further to optimize the system, and the resulting information can be used as inputs to other transformations as defined in the system, creating a daisy chain of inputs, transformations and outputs, e.g., to provide inputs for other machine learning models (block 708) or to trigger recalculation events for other processes (block 710). Moreover, if the basic inputs are changed externally, the data lake may also follow the original sequence to recalculate from the very first change to input to the very last result captured without intervention, e.g., as illustrated by automated optimizer block 712. Relationships between the consumed data and the earlier transformations may also be tracked, as well as the optimizer and/or iterations used by optimizer block 712.

In the aforementioned example, a predicted log curve of a certain channel may be generated based on a large number of drilling log files as inputs within certain geometric proximity to a target location. Transformations may prepare the data by validating and cleansing the log data, and the designated log channel may be generated based on the log curve pattern of other files. When the input log changes, these transformations may be automatically rerun to generate a new version of the log curve.

Another such example is to use machine learning to predict failures of equipment such as electrical submersible pumps or drilling motors using past operational event logs of similar equipment in similar operating conditions. Furthermore, the machine learning models can be used to generate this equipment's maintenance schedules. The difference between predicted results and actual events may then be fed back into the machine learning process to optimize the model and the maintenance schedule without human intervention.

Figure 8:
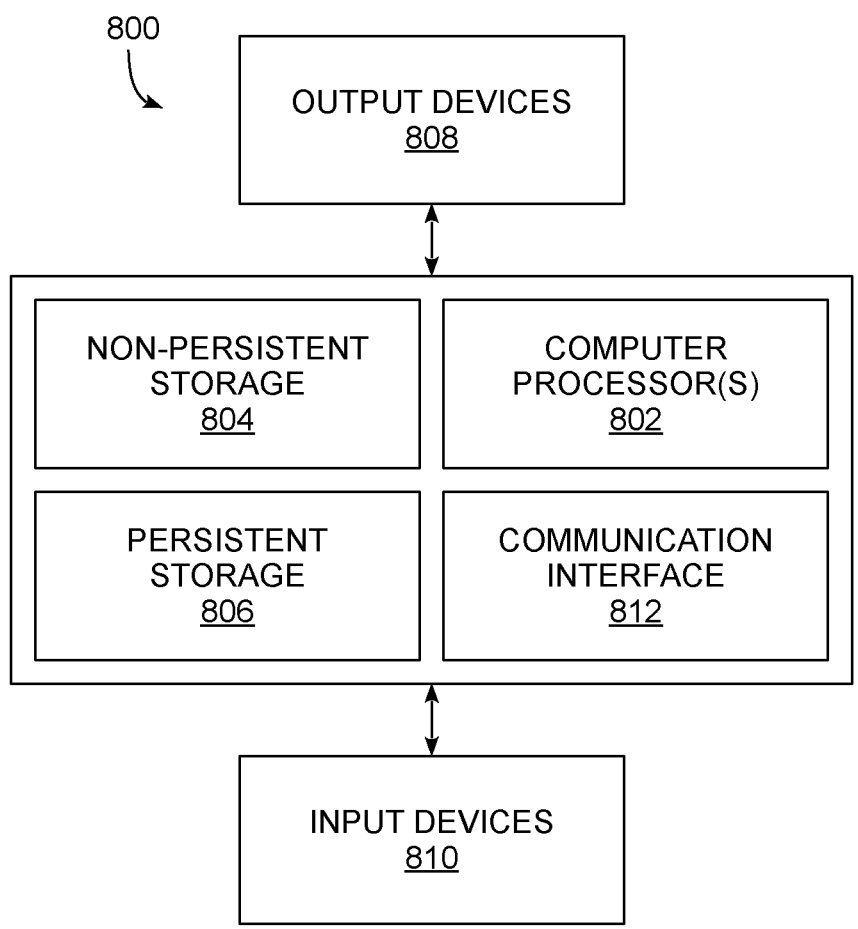
FIG. 8 illustrates an example computing system that can implement the various functions and features described herein.

Embodiments may be implemented on a computing system. Any combination of mobile, desktop, server, router, switch, embedded device, or other types of hardware may be used. For example, as shown in FIG. 8, the computing system 800 may include one or more computer processors 802, non-persistent storage 804 (e.g., volatile memory, such as random access memory (RAM), cache memory), persistent storage 806 (e.g., a hard disk, an optical drive such as a compact disk (CD) drive or digital versatile disk (DVD) drive, a flash memory, etc.), a communication interface 812 (e.g., Bluetooth interface, infrared interface, network interface, optical interface, etc.), and numerous other elements and functionalities.

The computer processor(s) 802 may be an integrated circuit for processing instructions. For example, the computer processor(s) may be one or more cores or micro-cores of a processor. The computing system 800 may also include one or more input devices 810, such as a touchscreen, keyboard, mouse, microphone, touchpad, electronic pen, or any other type of input device.

The communication interface 812 may include an integrated circuit for connecting the computing system 800 to a network (not shown) (e.g., a local area network (LAN), a wide area network (WAN) such as the Internet, mobile network, or any other type of network) and/or to another device, such as another computing device.

Further, the computing system 800 may include one or more output devices 808, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 802, non-persistent storage 804, and persistent storage 806. Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

Figure 9:
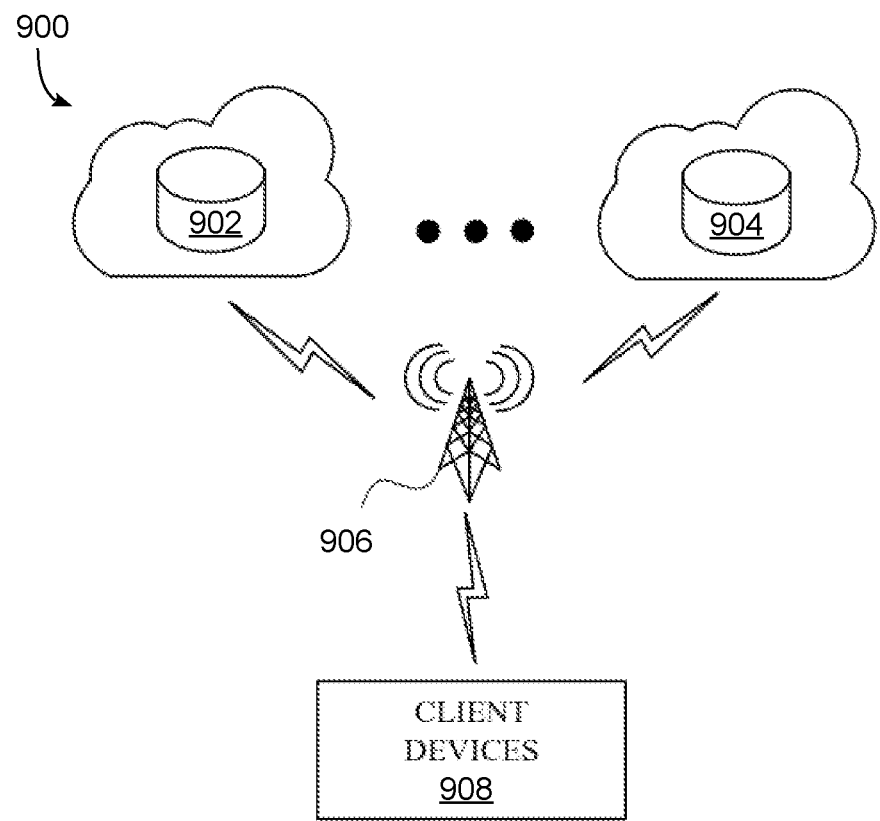
FIG. 9 illustrates an example network that can implement the various functions and features described herein.

The computing system 800 in FIG. 8 may be connected to or be a part of a network, such as the network 906 described by system 900 of FIG. 9. For example, as shown in FIG. 9, the network 906 may include multiple nodes (e.g., node X 902, node Y 904). Each node may correspond to a computing system, such as the computing system shown in FIG. 8, or a group of nodes combined may correspond to the computing system shown in FIG. 8. By way of an example, embodiments may be implemented on a node of a distributed system that is connected to other nodes. By way of another example, embodiments may be implemented on a distributed computing system having multiple nodes, where each portion of the embodiment may be located on a different node within the distributed computing system. Further, one or more elements of the aforementioned computing system 800 may be located at a remote location and connected to the other elements over a network.

Although not shown in FIG. 9, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 902, node Y 904) in the network 906 may be configured to provide services for a client device 908. For example, the nodes may be part of a cloud computing system. The nodes may include functionality to receive requests from the client device 808 and transmit responses to the client device 908. The client device 908 may be a computing system, such as the computing system shown in FIG. 8. Further, the client device 1008 may include and/or perform all or a portion of one or more embodiments.

The computing system or group of computing systems described in FIGS. 9 and 10 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

The above description of functions present only a few examples of functions performed by the computing system of FIG. 8 and the nodes and/or client device in FIG. 9. Other functions may be performed using one or more embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
    receiving data from a client device to obtain received data, the received data associated with an operation occurring at an exploration and production system of oilfield operations with a plurality of data sources;
    ingesting the received data into a data lake using ingestor components of the plurality of data sources to generate ingested data, wherein ingesting the received data includes storing the received data in the data lake in a first format, the first format being a same format in which the received data is received;
    indexing the ingested data into a search index;
    receiving a request to export, from the data lake, the ingested data in a second format that is different than the first format in which the received data is received and stored;
    generating, from the data lake and using the index, a consumption model for the ingested data, wherein the consumption model is configured to transform the ingested data in the first format;
    applying the consumption model to the ingested data in the first format to generate modified data in the first format;
    applying, after applying the consumption model to the ingested data, one or more transformations to the modified data to convert the modified data into formatted data that is formatted in the second format;
    exporting the formatted data from the data lake to a consumption service;
    tracking the one or more transformations made to the modified data to generate tracking data;
    storing, in the data lake, the tracking data as a set of nodes and edges in a graph database;
    receiving, after storing, an external change to the modified data to generate changed data; reapplying, using the tracking data in the graph database, the one or more transformations to the changed data to generate reformatted changed data;

receiving changed received data comprising a change to the received data:

generating metadata by applying a transformation to the changed received data, wherein the generated metadata comprises at least one of quality score, verified channels and verified channel units;

rerunning, automatically using the tracking data, the consumption model on the changed received data and the metadata to generate changed modified data in the first format;

reapplying the one or more transformations to the changed modified data to convert the changed modified data into changed formatted data that is formatted in the second format; and returning the changed formatted data to the consumption service.

2. The method of claim 1, wherein ingesting the received data includes tracking an origin of the received data, wherein applying the one or more transformations includes generating metadata from the one or more transformations, and wherein the method further comprises, in response to the external change to the received data, identifying the origin of the data and automatically reapplying the one or more transformations to the changed data using the tracking data.

3. The method of claim 1, wherein applying the one or more transformations includes applying a machine language transformation to the ingested data or to data transformed by another transformation.

4. The method of claim 1, wherein tracking the one or more transformations includes tracking an origin, a provenance and/or a lineage of the received data.

5. The method of claim 1, wherein tracking the one or more transformations includes tracking a transformation of a process and/or a version of a transformation.

6. The method of claim 1, wherein applying the one or more transformations includes applying a data cleansing transformation, a data matching transformation, a frame of reference conversion transformation, a model mapping transformation, a data aggregation transformation, or a machine learning transformation.

7. The method of claim 1, wherein tracking the one or more transformations includes tracking a sequence of transformations applied to the received data.

8. The method of claim 1, further comprising consuming the data after applying the one or more transformations.

9. A system, comprising:
one or more processors; and
memory configured to store instructions that, when executed by one or more processors, cause the one or more processors to perform operations that include:
receiving data from a client device to obtain received data, the received data associated with an operation occurring at an exploration and production system of oilfield operations with a plurality of data sources;
ingesting the received data into a data lake using ingestor components of the plurality of data sources to generate ingested data, wherein ingesting the received data includes storing the received data in the data lake in a first format, the first format being a same format in which the received data is received;
indexing the ingested data into a search index;
receiving a request to export, from the data lake, the ingested data in a second format that is different than the first format in which the received data is received and stored;
generating, from the data lake and using the index, a consumption model for the ingested data, wherein the consumption model is configured to transform the ingested data in the first format;
applying the consumption model to the ingested data in the first format to generate modified data in the first format;
applying, after applying the consumption model to the ingested data, one or more transformations to the modified data to convert the modified data into formatted data that is formatted in the second format;
exporting the formatted data from the data lake to a consumption service;
tracking the one or more transformations made to the modified data to generate tracking data;
storing, in the data lake, the tracking data as a set of nodes and edges in a graph database;
receiving, after storing, an external change to the modified data to generate changed data;
reapplying, using the tracking data in the graph database, the one or more transformations to the changed data to generate reformatted changed data;
receiving changed received data comprising a change to the received data;
generating metadata by applying a transformation to the changed received data, wherein the generated metadata comprises at least one of quality score, verified channels and verified channel units;
rerunning, automatically using the tracking data, the consumption model on the changed received data and the metadata to generate changed modified data in the first format;
reapplying the one or more transformations to the changed modified data to convert the changed modified data into changed formatted data that is formatted in the second format; and
returning the changed formatted data to the consumption service.

10. The system of claim 9, wherein ingesting the received data includes tracking an origin of the received data, wherein applying the one or more transformations includes generating metadata from the one or more transformations, and wherein the system further comprises operations that, in response to the external change to the received data, identify the origin of the data and automatically reapply the one or more transformations to the changed data using the tracking data.

11. The system of claim 9, wherein applying the one or more transformations includes applying a machine language transformation to the ingested data or to data transformed by another transformation.

12. The system of claim 9, wherein tracking the one or more transformations includes tracking an origin, a provenance and/or a lineage of the received data.

13. The system of claim 9, wherein tracking the one or more transformations includes tracking a transformation of a process and/or a version of a transformation.

14. The system of claim 9, wherein applying the one or more transformations includes applying a data cleansing transformation, a data matching transformation, a frame of reference conversion transformation, a model mapping transformation, a data aggregation transformation, or a machine learning transformation.

15. The system of claim 9, wherein tracking the one or more transformations includes tracking a sequence of transformations applied to the received data.

16. The system of claim 9, wherein the operations further include consuming the data after applying the one or more transformations.

17. A non-transitory computer readable medium configured to store instructions that, when executed by one or more processors, cause the one or more processors to perform operations that include:
- receiving data from a client device to obtain received data, the received data associated with an operation occurring at an exploration and production system of oilfield operations with a plurality of data sources;
- ingesting the received data into a data lake using ingestor components of the plurality of data sources to generate ingested data, wherein ingesting the received data includes storing the received data in the data lake in a first format, the first format being a same format in which the received data is received;
- indexing the ingested data into a search index;
- receiving a request to export, from the data lake, the ingested data in a second format that is different than the first format in which the received data is received and stored;
- generating, from the data lake and using the index, a consumption model for the ingested data, wherein the consumption model is configured to transform the ingested data in the first format;
- applying the consumption model to the ingested data in the first format to generate modified data in the first format;
- applying, after applying the consumption model to the ingested data, one or more transformations to the modified data to convert the modified data into formatted data that is formatted in the second format;
- exporting the formatted data from the data lake to a consumption service;
- tracking the one or more transformations made to the modified data to generate tracking data;
- storing, in the data lake, the tracking data as a set of nodes and edges in a graph database;
- receiving, after storing, an external change to the modified data to generate changed data;
- reapplying, using the tracking data in the graph database, the one or more transformations to the changed data to generate reformatted changed data;
- receiving changed received data comprising a change to the received data;
- generating metadata by applying a transformation to the changed received data, wherein the generated metadata comprises at least one of quality score, verified channels and verified channel units;
- rerunning, automatically using the tracking data, the consumption model on the changed received data and the metadata to generate changed modified data in the first format;
- reapplying the one or more transformations to the changed modified data to convert the changed modified data into changed formatted data that is formatted in the second format; and
- returning the changed formatted data to the consumption service.

* * * * *